May 3, 1938.   F. W. SLACK   2,115,918
MOTOR VEHICLE
Filed Dec. 18, 1935   3 Sheets-Sheet 1
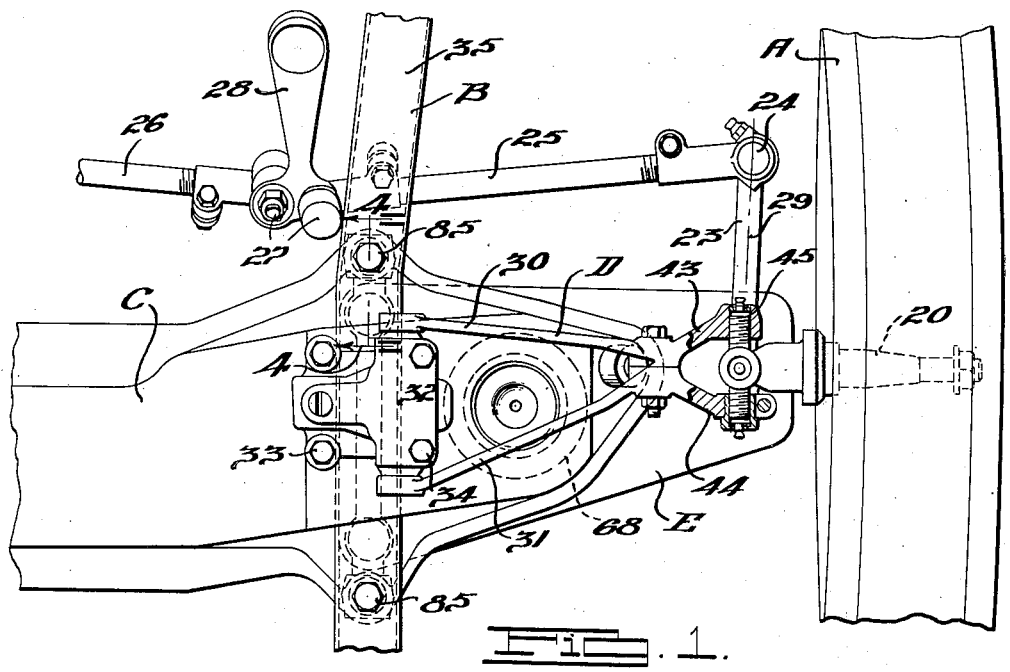
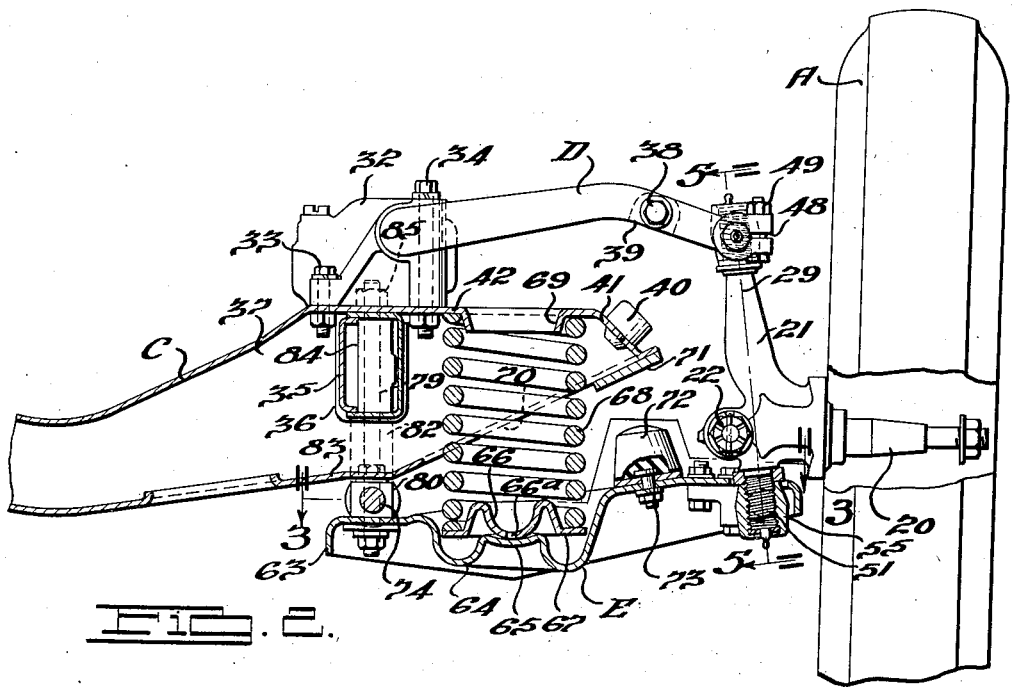
INVENTOR
Frederic W. Slack.
BY
Harness, Lind, Patee & Harris
ATTORNEYS.

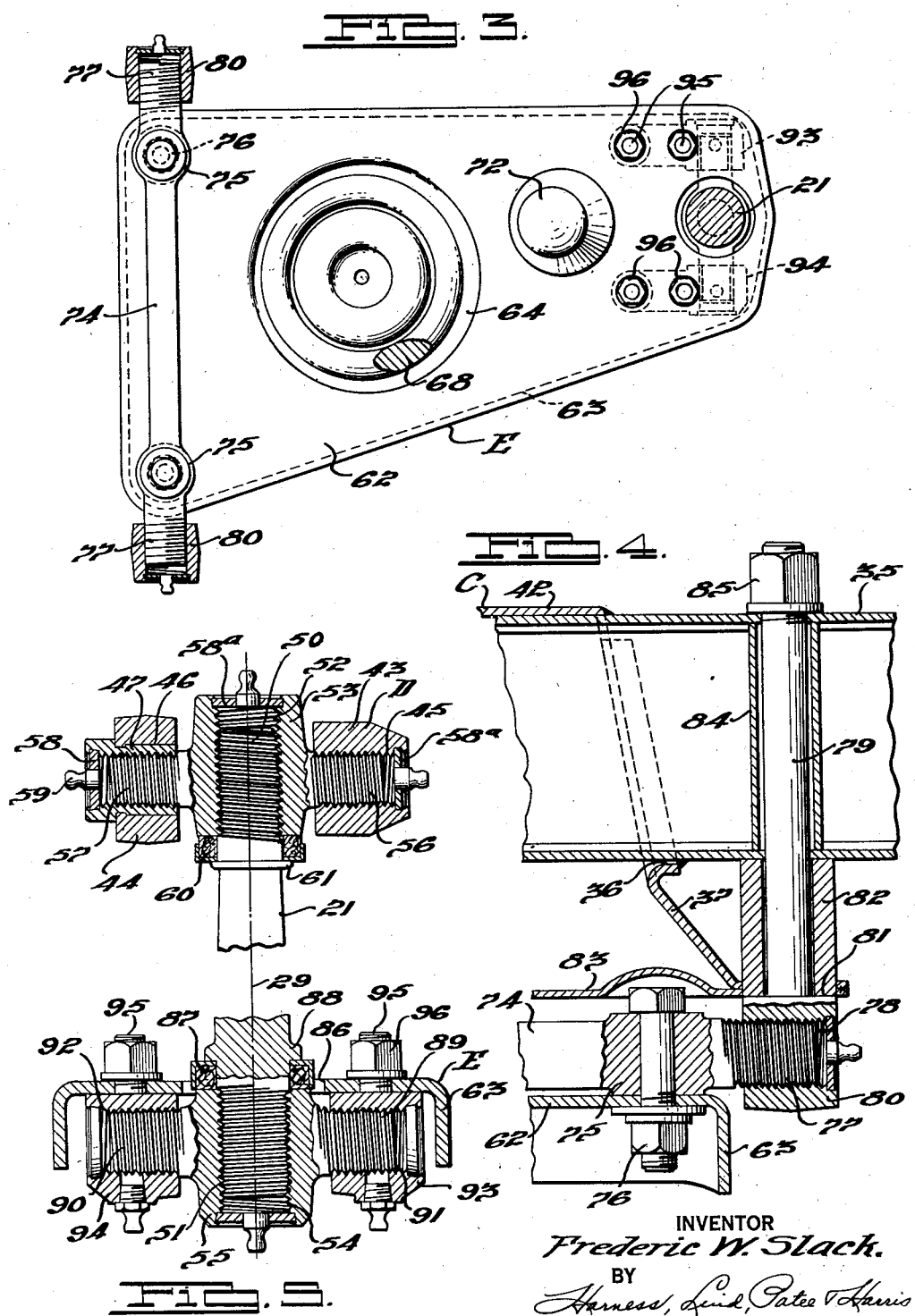

May 3, 1938.  F. W. SLACK  2,115,918
MOTOR VEHICLE
Filed Dec. 18, 1935    3 Sheets-Sheet 3

INVENTOR
Frederic W. Slack.
BY
*Harness, Dund, Pates & Harris*
ATTORNEYS.

Patented May 3, 1938

2,115,918

UNITED STATES PATENT OFFICE 2,115,918

MOTOR VEHICLE

Frederic W. Slack, Detroit, Mich., assignor to Chrysler Corporation, Highland Park, Mich., a corporation of Delaware Application December 18, 1935, Serial No. 54,982

21 Claims. (Cl. 280—96.2)

This invention relates to motor vehicles and refers more particularly to improvements in suspension systems or mechanisms for the ground wheels of said vehicles.

My invention is more particularly related to motor vehicles having steerable ground wheels of the independently sprung type although in its broader aspects many of the features of my invention may be applied to non-steering ground wheels, such as the rear wheels of a motor vehicle.

One object of my invention is to provide a relatively simple wheel suspension of the character referred to, capable of manufacture at relatively low cost; a suspension having improved characteristics of operation and durability; and a suspension adapted for assembly in an improved manner and method.

A further feature of my invention resides in the provision of a wheel carrying knuckle bracket which provides the king pin for swivelling the steerable wheel, this knuckle bracket connecting the upper and lower linkages of the independent suspension system. My improved suspension eliminates many of the joints and connections heretofore used in independent wheel suspensions, thereby greatly simplifying the cost of manufacturing the vehicle, as well as providing less likelihood of errors in the manufacture and assembly of the cars so that ordinarily caster and camber adjusting mechanism may be dispensed with as well as providing for other improvements.

Another object of my invention resides in the provision of improved means for assembling the knuckle bracket to the linkages, preferably by providing threaded bearings which swivel the wheel and provide for improved assembly, especially when the opposite ends of the bracket are oppositely threaded according to a further feature of my invention.

An additional feature of my invention resides in an improved suspension link capable of manufacture at relatively low cost. This link, which may be the upper or lower link, or both, is so constructed that it may be formed of a sheet metal stamping having an improved coil spring seat where this type of spring is employed in the system for yieldingly supporting the frame on the ground wheels.

Another object of my invention is to provide an improved and simplified adjusting mechanism for wheel camber, where such camber adjustment is desired. This adjusting mechanism is so constructed that it is inherently provided in the suspension mechanism without requiring the addition of parts as heretofore deemed necessary to effect such adjustment.

My wheel suspension mechanism is preferably of the parallelogram type of linkage, especially where the lower linkage is formed of a stamping. This provides a relatively short length linkage adapting the arrangement for use of a stamped construction without danger of overloading and without requiring a very heavy stamping although obviously, the more conventional arrangements of trapezoid linkages and forged link arms may be employed if desired.

Further objects and advantages of my invention will be more apparent from the following detailed description of one illustrative embodiment of my invention, reference being had to the accompanying drawings, in which:

Fig. 1 is a top plan view of a typical side portion of the front end of a vehicle illustrating my improved wheel suspension.

Fig. 2 is a sectional front elevational view of the Fig. 1 suspension.

Fig. 3 is a detailed sectional plan view illustrating the lower linkage, the view being taken as indicated by the line 3—3 of Fig. 2.

Fig. 4 is a detailed sectional elevational view taken as illustrated on the line 4—4 of Fig. 1 illustrating one of the frame pivotal supports for the inner end of the lower linkage.

Fig. 5 is a sectional elevational view through the line 5—5 of Fig. 2 illustrating the knuckle bracket member and its connections with the upper and lower linkages.

Figure 6:
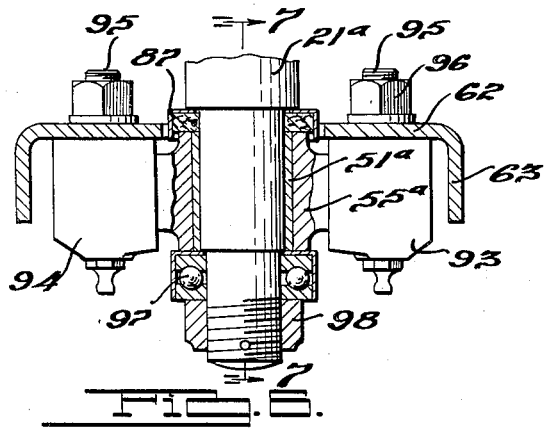
Fig. 6 is a detailed sectional elevational view corresponding to the lower half of Fig. 5 but illustrating a modified form of bearing for the lower end of the knuckle bracket.

In the drawings, reference character A represents a steering front ground wheel of the vehicle having the frame structure B which includes the cross member C. Since each front wheel is preferably similarly suspended, my description will, for the most part, be directed to a representative side of the vehicle, as illustrated in Figs. 1 and 2.

The wheel A is rotatably mounted on the spindle 20 which is preferably an integral lateral projection of the knuckle bracket 21 having secured thereto at 22 the rearwardly extending steering arm 23 articulated at 24 to a tie rod 25, the tie rod for the opposite wheel being designated at 26. The inner ends of these tie rods are articulated at 27 to a steering arm 28 adapted to be manually actuated for steering the wheels A in any well known manner.

The knuckle bracket 21 is preferably a unitary forging and provides a king pin for the wheel A along an axis of swing indicated at 29. This axis 29 is preferably so arranged that the wheel is normally disposed in a plane which tilts upwardly and outwardly to provide the well known camber angle, the axis 29 being preferably also tilted in the fore and aft direction to provide the usual caster angle for swivelling the wheel.

The knuckle bracket 21 is disposed in a general vertical direction and has its opposite ends articulated to the upper and lower linkages D and E, respectively, to provide for the aforesaid swinging movement of the knuckle bracket about the axis 29 and also to pivot the knuckle bracket with the linkages so that the wheel is free to rise and fall guided by the linkages D and E. The upper link D is illustrated as the wishbone type having inwardly diverging arms 30, 31 pivotally supported along an axis which preferably extends substantially parallel to the vertical plane containing the longitudinal axis of the vehicle although, if desired, such pivotal axis may be arranged at an acute angle to said plane.

The pivotal supports or arms 30, 31 may be provided by the hydraulic shock absorber 32 bolted at 33, 34 to the cross member C at opposite sides laterally of the frame side rail 35 which is preferably of the box type and passes through a suitable opening 36 in the webs 37 of the cross member C.

Toward the outer ends of the arms 30, 31, these arms converge at the connecting bolts 38, at which point the two arms are formed to provide a flat under-surface 39 for striking against a yielding rubber abutment 40 carried by the outer downwardly deflected end portion 41 of the horizontal web 42 of the cross member C.

The arms 30, 31 again separate outwardly of the connecting bolt 38 to provide spaced outer ends 43, 44, respectively. These ends are provided with longitudinally aligned openings, one of which is threaded at 45 (see Fig. 5), the other of which is designated at 46 and receives the internally threaded sleeve bushing 47. The arm end 44 is split at 48 outwardly of bushing 47 for action in conjunction with a clamping bolt assembly 49 for tightly holding the bushing 47 in the opening 46.

The upper end of knuckle bracket 21 is threaded at 50, the lower end of the knuckle bracket being oppositely threaded at 51. The threaded end 50 is rotatably journaled by the internal threads 52 of the upper trunnion member 53, the lower threaded end 51 correspondingly engaging internal threads 54 of the lower trunnion member 55. The trunnion 53 has the oppositely extending longitudinal projections 56 and 57 threaded to provide pivotal connection between trunnion 53 and the respective threaded openings in arm portion 43 and bushing 47. The threaded opening in bushing 47 is preferably closed beyond the trunnion extension 57 by a plug 58 formed with the lubricant fitting 59, by reason of which a suitable lubricant may be admitted to the pivotal bearing within the bushing 47. Similar plugs and lubricant fittings, generally designated at 58ᵃ, are preferably associated with the threaded opening 52 of trunnion 53 and with the threaded opening 45 of arm portion 43. A lubricant seal 60 supported by the knuckle bracket shoulder 61 surrounds the upper end portion of knuckle bracket 21 below the trunnion 53 to prevent the escape of lubricant downwardly from the threaded bearing provided by the arms 50, 52.

In the present embodiment of my invention I have illustrated the lower linkage E in the form of a metal stamping having the main body portion 62 formed with a downwardly extending marginal stiffening flange 63. Intermediate the lateral length of the lower linkage E, the body portion 62 is formed with an annular return bend 64 at the central spherical seat 65 adapted to provide a rigid structure for seating the spherical portion 66 of the spring seat 67. The radius of sphere 66 is less than that of seat 65 so that for normal movements of link E, accompanied by inclinations of the axis of spring 68, the surface 66 rolls in seat 65 although there may be some sliding for extreme movements of link E relative to the frame. This provides for noiseless free movements of link E and relieves binding tendency in the coil spring, the upper end of which acts against web 42 of cross member C. This web member is provided with a depressed flange 69 for centering the upper end of the coil spring, the lower end of the coil spring acting on seat 67 being free to assume positions without binding tendencies as the wheel A rises and falls with respect to the vehicle frame. The depression formed at 66 collects lubricating oil admitted through flange 69, an opening 66ᵃ leading oil to the seat 65 where it also collects to lubricate the seat to further increase the free movement without noise at parts 65, 66.

It will thus be noted that the coil spring 68 is positioned laterally beyond the frame side member 35, the cross member C having the lateral cantilever projection forming the coil spring seat at 69 and carrying the yieldable bumper 40 outwardly beyond the coil spring. The longitudinally spaced webs 37 of the cantilever portion of the cross member C provide a housing for the upper end of coil spring 68, the lower edges of flanges 37 being inclined outwardly and upwardly and connected at their outer ends by the inclined plate 71 adapted to provide an abutment for the rubber bumper 72 secured at 73 to the body portion 62 of the lower linkage E for limiting relative approaching movement between the frame and the lower linkage.

In order to pivotally connect the inner end of the lower linkage to the frame for swinging movement on an axis parallel to that provided for the upper linkage D, I have provided the bar 74 seated by the longitudinally spaced bosses 75 on the upper face of the body portion 62, the nut and bolt assemblies 76 serving to secure the bar to the body 62 adjacent the marginal flange 63 thereof. The bar 74 has its opposite ends projecting beyond flange 63 and threaded at 77 to provide a pivotal journal in the lower threaded end portions 78 of the respective bolt members 79. The lower end of each bolt 79 has a circular boss 80 for forming the internally threaded bearing 78, the upper face of this boss being flattened at 81 for bearing against a cylindrical spacer 82 which bears against the underface of the side rail 35. The lower edge of the cross brace flange 37 extends longitudinally in welded face contact with the bottom web member 83, the spacer 82 extending through a suitable opening in flange 31 and web 83. The bolt 79 projects upwardly integrally from the boss 80 above the flat 81, through the spacer 82 and side rail 35, a second cylindrical spacer 84 serving to stiffen the hollow rail 35 when the bolt-engaging nut 85 is secured in place to draw the parts rigidly together. A similar arrangement to that illustrated in Fig. 4 is provided at the forwardly extending end of bar 74 as will be readily understood.

Referring now to the connecting means between the lower end of the knuckle bracket 21 and the outer end of the lower linkage E, the body portion 62 is provided with an opening 86 through which the lower end of the knuckle bracket extends with sufficient clearance provided to accommodate the relative movement between the knuckle bracket and linkage. The lower threaded bearing at 51 is sealed against upward escape of lubricant by the annular sealing assembly 87 seating between the knuckle bracket boss 88 and the upper face of the lower trunnion 55. This trunnion has the oppositely extending threaded longitudinal projections 89 and 90 respectively threadedly engaging aligned openings 91 and 92 of the journal members 93 and 94 having face contact with the under-surface of the body portion 62 adjacent the marginal flange 63 thereof, as best seen in Figs. 2, 3 and 5. Each of these bearing members has an upwardly extending integral bolt portion 95 receiving a threaded nut 96 at the upper side of body portion 62 for tightly securing the bearing members to the body portion 62. Each of the bearing members 93, 94 is preferably provided with a plurality of the bolt and nut assemblies 95, 96, as best seen in Fig. 3, in order to prevent relative movement between these bearing members and the lower linkage.

In the operation of the suspension mechanism, the wheel A is supported and guided in rising and falling movement by the knuckle bracket 21 and the upper and lower linkages D and E. The knuckle bracket during such movement pivots with these linkages at the upper trunnion bearings 56, 57 and also at the lower trunnion bearings 89, 90. The upper link D is swingingly connected to the shock absorber 32 and the lower linkage E swings by reason of the threaded bearings 77 at the ends of bar 74, which not only provides these bearings but further serves as a reinforcing or bracing means for the lower linkage. The front end of the frame structure is yieldingly supported through the coil springs 68 on the respective lower linkages E associated with each side steering wheel A.

When steering movements are imparted to the wheels A through their steering arms 23 and associated tie rods 25, 26, each steering wheel swivels about the axis 29 provided by the knuckle bracket 21 and the upper and lower threaded bearings 50, 51 in the associated trunnion members 53, 55.

The oppositely threaded ends 50, 51 of the knuckle bracket 21 provides for improved assembly of the knuckle bracket with the upper and lower linkages D and E, as a bench assembly, since it will be apparent that the linkages may be held stationary and the knuckle bracket 21 rotated to thread the ends into the trunnions 53 and 55, bringing these trunnions toward one another to their assembled relationship. During this assembly of the knuckle bracket 21 with the linkages, it will be apparent that the spindle 20 will not interfere with the assembly since the lower linkage E may be swung downwardly at its rear end so that the spindle 20 will not strike the bumper 72. If desired, this bumper may be assembled to the lower linkage subsequent to the assembly of the knuckle bracket 21 although this is not necessary.

The knuckle bracket 21 and spindle 20 are preferably made as a unitary forging, thereby materially reducing the weight and cost of the corresponding parts of more conventional suspension systems, it being noted that the knuckle bracket 21 provides the king pin for the steering wheel A. Heretofore, relatively high bearing pressures resulted at the conventional king pins since the bearings therefor were positioned relatively closely together. However, with my arrangement, the bearings at 50, 51 are widely separated, thereby reducing the unit pressure. Furthermore, these threaded bearings increase the area of contact and further serve to reduce the unit pressure.

Figure 7:
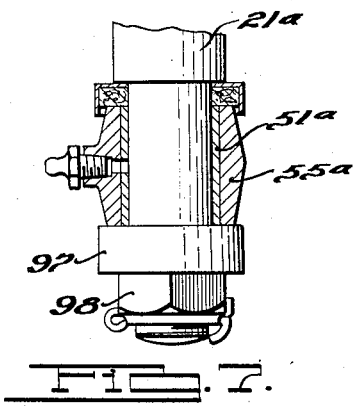
Fig. 7 is a sectional view taken as illustrated by the line 7—7 of Fig. 6.

Referring to Figs. 6 and 7, I have illustrated a modified arrangement for the lower end of the knuckle bracket 21a, which has a plain cylindrical bearing 51a for the steering swivelling action with the lower trunnion member 55a. In this modification I have illustrated an anti-friction thrust bearing 97 between the trunnion 55a and the lower end of the knuckle bracket 21a which carries the nut 98. The construction is preferably otherwise as previously described and is intended to be substituted for the corresponding structure in the previously described assembly, as will be readily understood. The arrangement illustrated in Figs. 6 and 7 provides for somewhat easier steering movement by reason of the load being taken on the anti-friction bearing 97 although, in practice, I have found that the Fig. 5 arrangement is entirely satisfactory in providing the desired degree of easy steering characteristics.

Figure 8:
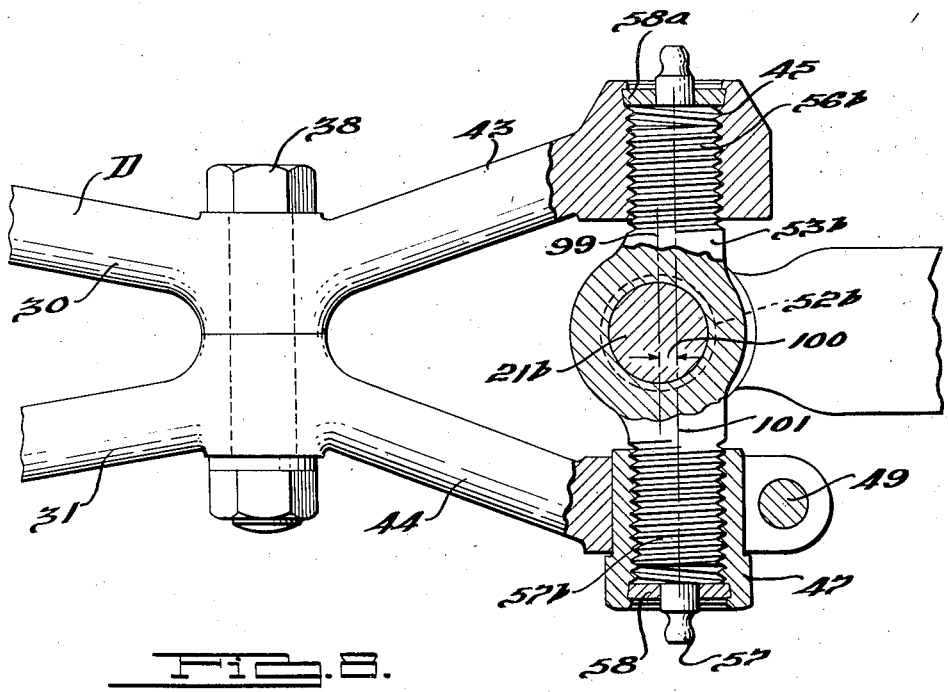
Fig. 8 is a detailed sectional plan view illustrating a further modified arrangement for connecting the knuckle bracket with the upper linkage for providing camber adjustment of the wheel.

Referring to Fig. 8, I have illustrated a further modification in connection with the upper end of the knuckle bracket 21b and the upper trunnion 53b, the latter having the same longitudinal threaded extensions 56b and 57b for pivotally engaging the same parts of the upper link as previously described and as indicated by the use of the same reference characters. In the Fig. 8 arrangement the longitudinal center line 99 of the threaded trunnion bearing 52b is offset as indicated at 100, from the longitudinal axis 101 of the threaded ends of the trunnion 53b.

This mechanism provides for two settings laterally of the vehicle, for the upper end of the knuckle bracket 21, one of these settings being illustrated in Fig. 8. In order to obtain the other setting or adjustment for wheel camber, the knuckle bracket 21 is disengaged from trunnion 53b and the latter is rotated 180 degrees to throw the eccentricity at 100 laterally outwardly with respect to axis 101 instead of inwardly thereof as illustrated in Fig. 8. This will, of course, tilt the upper end of the knuckle bracket 21b outwardly and increase the camber setting for the associated wheel. Ordinarily it is not necessary to provide for camber or caster settings for the steering wheels, particularly in view of the fact that my mechanism provides relatively few joints between the wheel and the frame, thereby materially reducing the likelihood of an accumulation of manufacturing errors in the production and assembly of the mechanism as has been experienced heretofore with more conventional systems.

Various modifications and changes will be apparent from the teachings of my invention, as defined in the appended claims, and it is not my intention to limit my invention to the particular details of construction and mode of operation shown and described for illustrative purposes.

I claim:

1. In a motor vehicle independent wheel suspension of the type having upper and lower linkages articulated at their inner ends to the vehicle frame structure, a knuckle bracket intermediate the outer ends of said linkages, said knuckle bracket having a wheel spindle projecting therefrom and forming a rigid structure therewith, and means connecting said knuckle bracket to said linkages so constructed and arranged as to provide steering movements of said knuckle bracket and pivoting between said linkages and said knuckle bracket to accommodate rising and falling movements of said wheel, one of said knuckle bracket and linkage connecting means comprising a trunnion provided with a central bearing for one end of said knuckle bracket, said trunnion having a portion extending therefrom, and a journal member rigidly attached to the associated linkage and rotatably receiving said extending portion to provide a pivotal bearing with said associated linkage.

2. In a motor vehicle independent wheel suspension of the type having upper and lower linkages articulated at their inner ends to the vehicle frame structure, a knuckle bracket intermediate the outer ends of said linkages, said knuckle bracket having a wheel spindle projecting therefrom and forming a rigid structure therewith, and means connecting said knuckle bracket to said linkages so constructed and arranged as to provide steering movements of said knuckle bracket and pivoting between said linkages and said knuckle bracket to accommodate rising and falling movements of said wheel, one of said knuckle bracket and linkage connecting means comprising a trunnion having an offset portion, a journal member rigidly secured to the associated linkage for pivotally connecting said trunnion to the associated linkage on an axis extending generally longitudinally of the vehicle, said trunnion having a bearing portion journalling one end of said knuckle bracket on an axis extending generally vertically.

3. In a motor vehicle independent wheel suspension of the type having upper and lower linkages articulated at their inner ends to the vehicle frame structure, a knuckle bracket intermediate the outer ends of said linkages, said knuckle bracket having a wheel spindle projecting therefrom and forming a rigid structure therewith, and means connecting said knuckle bracket to said linkages so constructed and arranged as to provide steering movements of said knuckle bracket and pivoting between said linkages and said knuckle bracket to accommodate rising and falling movements of said wheel, one of said knuckle bracket and linkage connecting means comprising a trunnion having a central portion formed with a bearing receiving one end of said knuckle bracket, said trunnion having a pair of oppositely extending aligned bearings projecting from said central portion, and a pair of journal members rigidly attached to the associated linkage and respectively rotatably receiving said bearing projections for pivotal connection with said associated linkage.

4. In a motor vehicle independent wheel suspension of the type having upper and lower linkages articulated at their inner ends to the vehicle frame structure, a knuckle bracket intermediate the outer ends of said linkages, said knuckle bracket having a wheel spindle projecting therefrom and forming a rigid structure therewith, said knuckle bracket comprising a substantially vertical arm having its upper and lower end portions threaded oppositely, and a pair of threaded bearings respectively carried by said upper and lower linkages for journalling said arm end portions to provide for steering movements of said wheel.

5. In a motor vehicle independent wheel suspension of the type having upper and lower linkages articulated at their inner ends to the vehicle frame structure, an upright arm for rotatably carrying said wheel, and means for pivotally connecting the opposite ends of said arm to said linkages respectively, one of said connecting means including a bearing carried by one of said linkages, said bearing having threads journalling one end of said arm and so constructed and arranged to accommodate oscillation of said arm around an upright axis.

6. In a motor vehicle independent wheel suspension of the type having upper and lower linkages articulated at their inner ends to the vehicle frame structure, an upright arm for rotatably carrying said wheel, and means for pivotally connecting each end of said arm respectively to said linkages for accommodating rising and falling movements of said wheel and swivelling of said wheel and arm about an upright axis, one of said pivotal connecting means including a threaded bearing journalling one end of said arm for swivelling thereof about said axis.

7. In a motor vehicle independent wheel suspension of the type having upper and lower linkages articulated at their inner ends to the vehicle frame structure, an upright arm for rotatably carrying said wheel, and means for pivotally connecting each end of said arm respectively to said linkages for accommodating rising and falling movements of said wheel and swivelling of said wheel and arm about an upright axis, each of said pivotal connecting means including a threaded bearing journalling one end of said arm for swivelling thereof about said axis, said arm ends being oppositely threaded for engagement with said threaded bearings respectively.

8. In a motor vehicle wheel suspension of the independently sprung type, a frame structure, means intermediate said wheel and frame structure for supporting said wheel and guiding said wheel for rising and falling movements thereof independently of the remaining vehicle wheels, said supporting and guiding means including a swinging arm structure formed of a sheet metal stamping, means for pivotally connecting opposite ends of said sheet metal arm structure to said wheel and frame structure, said stamping having a portion thereof intermediate its said ends deflected to impart rigidity thereto, and a coil spring thrusting between said frame structure and the deflected portion of said stamping.

9. In a motor vehicle wheel suspension of the independently sprung type, a frame structure, means intermediate said wheel and frame structure for supporting said wheel and guiding said wheel for rising and falling movements thereof independently of the remaining vehicle wheels, said supporting and guiding means including a stamped sheet metal support link formed with a marginal stiffening flange, means for pivotally connecting said link to said wheel and frame structure, said connecting means engaging said link adjacent said marginal flange, said stamped link being formed with a spring-thrust-receiving deflected portion intermediate said marginal flange to impart rigidity thereto, and a coil spring thrusting between said frame structure and the deflected portion of said stamped link.

10. In a motor vehicle wheel suspension of the independently sprung type, a frame structure, means intermediate said wheel and frame structure for supporting said wheel and guiding said wheel for rising and falling movements thereof independently of the remaining vehicle wheels, said supporting and guiding means including a stamped link structure, means for pivotally connecting said link structure to said wheel and frame structure, said link structure having a load receiving portion deflected to impart rigidity thereto, and a coil spring loaded by said frame structure and thrusting on said deflected link portion.

11. In a motor vehicle wheel suspension of the independently sprung type, a frame structure, means intermediate said wheel and frame structure for supporting said wheel and guiding said wheel for rising and falling movements thereof independently of the remaining vehicle wheels, said supporting and guiding means including a link structure having a curved bearing, a spring seat having a curved thrusting portion engaging said bearing, and a coil spring intermediate said frame structure and seat, said bearing and thrusting portion having different radii of curvature, said thrusting portion having a lubricant conducting opening directed toward said bearing.

12. In a motor vehicle wheel suspension of the independently sprung type having means intermediate said wheel and the vehicle frame structure for supporting said wheel and guiding said wheel for rising and falling movements thereof independently of the remaining vehicle wheels, said supporting and guiding means including a link, said link having an integrally formed curved bearing, means for pivotally connecting said link to said wheel and frame structure, a coil spring between said frame structure and link, and means for pivotally seating said coil spring on said link, said means comprising a spring seat having a curved thrust portion engaging said curved bearing.

13. In a motor vehicle wheel suspension of the independently sprung type having means intermediate said wheel and the vehicle frame structure for supporting said wheel and guiding said wheel for rising and falling movements thereof independently of the remaining vehicle wheels, said supporting and guiding means including a link extending generally laterally of the vehicle, means for pivotally connecting the outer end of said link to said wheel, a pivot bar carried by the inner end of said link, and a bolt secured to said frame structure and having a bearing journalling said bar to swingingly connect said link to said frame structure.

14. In a motor vehicle independent wheel suspension, a frame structure comprising a longitudinal side rail and a transverse cross member having a portion thereof projecting laterally beyond said side rail, an upright wheel support arm, an upper guide link extending laterally of said frame structure and pivotally connected at its inner and outer ends respectively to said frame structure and to the upper end of said arm, a lower guide link pivoted at its outer end to the lower end of said arm and having a pivot bar unrotatably fixed thereto adjacent its inner end, a coil spring between said lower link and said projecting portion of said cross member, longitudi-nally spaced bearing structures for journalling the inner end of said lower link pivot bar, each of said bearing structures having an upright frame connecting member extending through said side rail, and means for securing said connecting members to said frame structure.

15. In a motor vehicle independent wheel suspension, a frame structure comprising a longitudinal side rail and a transverse cross member having flanged edge portions, a portion of said cross member projecting laterally beyond said side rail, an upright wheel support arm, an upper guide link extending laterally of said frame structure and pivotally connected at its inner and outer ends respectively to said frame structure and to the upper end of said arm, a lower guide link pivoted at its outer end to the lower end of said arm, a coil spring between said lower link and said projecting portion of said cross member, longitudinally spaced bearing structures for journalling the inner end of said lower link, each of said bearing structures having an upright frame connecting member extending through said side rail and the flanged edge portions of said cross member, means for securing said connecting members to said frame structure, and vertically spaced spacing elements around each of said connecting members, said uppermost spacing elements bracing said side rail, said lowermost spacing elements being disposed between said side rail and said bearing structures respectively.

16. In a motor vehicle independent wheel suspension having a frame structure, means including a wheel supporting upright arm having oppositely extending lateral projections for operably connecting said wheel to said frame structure for guiding rising and falling movements of said wheel, said wheel connecting means further including a link having a sheet metal body portion extending generally laterally of the vehicle between said frame structure and one end of said arm, the outer end of said link body portion having an opening through which said arm end extends, spaced bearing members depending from said body portion adjacent said opening for receiving said lateral projections, respectively, and means for pivotally connecting said link to said frame structure.

17. In a motor vehicle independent wheel suspension having a frame structure, means including a wheel supporting upright arm for operably connecting said wheel to said frame structure for guiding rising and falling movements of said wheel, said wheel connecting means further including a link having a sheet metal body portion extending generally laterally of the vehicle between said frame structure and one end of said arm, the outer end of said link body portion having an opening through which said arm end extends, a bearing member depending from said body portion adjacent said opening, means for pivotally connecting said arm end to said bearing member, means for pivotally connecting the inner end of said body portion to said frame structure, and a coil spring between said frame structure and said body portion adapted to load said link between said pivotal connecting means for the inner and outer ends thereof.

18. In a motor vehicle independent wheel suspension including a frame structure comprising a longitudinal side rail and a transverse cross member having a portion thereof projecting laterally beyond said side rail, means including a wheel supporting upright arm for operably connecting said wheel to said frame structure for guiding rising and falling movements of said wheel, said wheel connecting means further including a link having a sheet metal body portion extending generally laterally of the vehicle between said frame structure and one end of said arm, the outer end of said link body portion having an opening through which said arm end extends, a bearing member depending from said body portion adjacent said opening, means for pivotally connecting said arm end to said bearing member, means for pivotally connecting the inner end of said body portion to said frame structure, a coil spring between said frame structure and said body portion adapted to load said link between said pivotal connecting means for the inner and outer ends thereof, and a yielding bumper carried by said link body portion intermediate said coil spring and said pivotal connecting means for the outer end of said link, said yielding bumper being disposed for engagement with the laterally projecting portion of said cross member upon abnormal relative movement between said wheel and frame structure.

19. In a motor vehicle independent suspension for a steerable ground wheel including a link pivoted to the vehicle frame structure and extending laterally therefrom, means including an upright arm for rotatably supporting said wheel, a trunnion having longitudinally extending ends pivotally connected to said link and an intermediate bearing rotatably journalling one end of said arm, said intermediate bearing having a generally vertically extending axis offset laterally of the vehicle with respect to a generally longitudinal axis of pivoting for said trunnion ends, said trunnion being adapted for selective positioning around said longitudinal axis to vary the normal position of said arm for effecting variation in the camber of said wheel.

20. In a motor vehicle independent suspension for a steerable ground wheel including a link pivoted to the vehicle frame structure and extending laterally therefrom, means including an upright arm for rotatably supporting said wheel, a trunnion having longitudinally extending ends pivotally connected to said link and an intermediate bearing rotatably journalling one end of said arm, said intermediate bearing having a generally vertically extending axis offset laterally of the vehicle with respect to a generally longitudinal axis of pivoting for said trunnion ends, said trunnion being adapted for selective positioning around said longitudinal axis to vary the normal position of said arm for effecting variation in the camber of said wheel, said journalled arm end being threaded in said intermediate bearing of said trunnion.

21. In a motor vehicle wheel suspension of the independently sprung type, a frame structure, means intermediate said wheel and frame structure for supporting said wheel and guiding said wheel for rising and falling movements thereof independently of the remaining vehicle wheels, said supporting and guiding means including a link structure having a curved bearing, a spring seat having a curved thrusting portion engaging said bearing, and a coil spring intermediate said frame structure and seat, said bearing and thrusting portion having different radii of curvature.

FREDERIC W. SLACK.